United States Patent
Gerstenberger et al.

(10) Patent No.: US 8,804,587 B2
(45) Date of Patent: Aug. 12, 2014

(54) METHODS AND ARRANGEMENTS FOR DOWNLINK MULTI-CARRIER POWER CONTROL IN A WIRELESS COMMUNICATIONS SYSTEM

(75) Inventors: Dirk Gerstenberger, Stockholm (SE); Samuel Axelsson, Stocksund (SE); Johan Bergman, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 602 days.

(21) Appl. No.: 12/989,677

(22) PCT Filed: Dec. 17, 2008

(86) PCT No.: PCT/SE2008/051475
§ 371 (c)(1),
(2), (4) Date: Oct. 26, 2010

(87) PCT Pub. No.: WO2009/134180
PCT Pub. Date: Nov. 5, 2009

(65) Prior Publication Data
US 2011/0044222 A1     Feb. 24, 2011

Related U.S. Application Data

(60) Provisional application No. 61/048,319, filed on Apr. 28, 2008.

(51) Int. Cl.
| | |
|---|---|
| *G08C 17/00* | (2006.01) |
| *H04L 5/00* | (2006.01) |
| *H04W 52/54* | (2009.01) |
| *H04W 52/14* | (2009.01) |
| *H04W 52/32* | (2009.01) |
| *H04W 52/58* | (2009.01) |

(52) U.S. Cl.
CPC ........... *H04W 52/143* (2013.01); *H04L 5/0016* (2013.01); *H04W 52/54* (2013.01); *H04W 52/325* (2013.01); *H04W 52/58* (2013.01); *H04L 5/0053* (2013.01)
USPC .......................................................... 370/311

(58) Field of Classification Search
CPC ..... H04W 84/18; H04W 84/12; H04W 88/00; H04W 80/04; H04W 72/00; H04W 72/02
USPC .............. 370/310, 310.2, 311, 313, 315, 328, 370/329, 331, 338
See application file for complete search history.

(56) References Cited

U.S. PATENT DOCUMENTS

| | | | |
|---|---|---|---|
| 2004/0235510 A1* | 11/2004 | Elicegui et al. | ................ 455/522 |
| 2005/0123062 A1 | 6/2005 | Bassompierre et al. | |

(Continued)

FOREIGN PATENT DOCUMENTS

| | | |
|---|---|---|
| EP | 1 367 739 A1 | 12/2003 |
| EP | 1 971 059 A1 | 9/2008 |
| JP | 2006-303664 A | 11/2006 |

(Continued)

*Primary Examiner* — Anh Ngoc Nguyen

(57) ABSTRACT

A method, User Equipment (UE), and radio base station or NodeB for controlling the downlink transmit power of a Fractional Downlink Physical Control Channel (F-DPCH) in a multi-carrier High-Speed Packet Access (HSPA) system. Single-carrier Transmit Power Control (TPC) commands are modified to support different kinds of multi-carrier scenarios. The UE defines at least one TPC command for adjustment of the transmit power of the F-DPCH of N downlink carriers, the number of TPC commands being equal to or less than N, and transmits the TPC command(s) on at least one of M uplink carriers. The NodeB receives the TPC command(s) and adjusts the transmit power of the F-DPCH of the N downlink carriers based on the received TPC command(s).

14 Claims, 8 Drawing Sheets

(56) References Cited

U.S. PATENT DOCUMENTS

| | | |
|---|---|---|
| 2006/0034382 A1 | 2/2006 | Ozluturk et al. |
| 2006/0246907 A1 | 11/2006 | Kaikkonen et al. |
| 2006/0262840 A1* | 11/2006 | Wang et al. .................. 375/221 |
| 2008/0200202 A1* | 8/2008 | Montojo et al. ............. 455/522 |
| 2010/0020704 A1* | 1/2010 | Hu et al. ...................... 370/252 |

FOREIGN PATENT DOCUMENTS

| | | |
|---|---|---|
| WO | WO 2006/020411 A | 2/2006 |
| WO | WO 2006/116102 A2 | 11/2006 |

* cited by examiner

METHODS AND ARRANGEMENTS FOR DOWNLINK MULTI-CARRIER POWER CONTROL IN A WIRELESS COMMUNICATIONS SYSTEM

This application claims the benefit of U.S. Provisional Application No.61/048,319, filed Apr. 28, 2008, the disclosure of which is fully incorporated herein by reference.

TECHNICAL FIELD

The present invention relates to the area of wireless communications, and especially to F-DPCH power control in a multi-carrier Universal Mobile Telecommunication System. More specifically, the invention relates to a method of F-DPCH power control in a radio base station and in a user equipment, as well as to a radio base station and a user equipment.

BACKGROUND

The Universal Mobile Telecommunication System (UMTS), also referred to as the third generation (3G) system or the wideband code division multiplexing access (WCDMA) system, is designed to succeed GSM. UMTS Terrestrial Radio Access Network (UTRAN) is the radio access network of a UMTS system.

High-Speed Downlink Packet Access (HSPDA) is an evolution of UTRAN bringing further enhancements to the provisioning of packet-data services both in terms of system and end-user performance. The downlink packet-data enhancements of HSDPA are complemented with Enhanced Uplink (EUL), also known as High-Speed Uplink Packet Access (HSUPA). EUL provides improvements in the uplink capabilities and performance in terms of higher data rates, reduced latency, and improved system capacity, and is therefore a natural complement to HSDPA. HSDPA and EUL are often jointly referred to as High-Speed Packet Access (HSPA). In the HSPA architecture, a user equipment (UE) 150 is wirelessly connected to a radio base station, i.e. a NodeB 130, as illustrated in FIG. 1.

The operation of WCDMA/HSPA on multiple 5 MHz frequency blocks—so called carriers—used simultaneously for one given UE, is one further step of evolving WCDMA and HSPA. This mode of operation is often referred to as multi-carrier HSPA.

A multi-carrier connection with frequency division duplex (FDD) can be described as a set of downlink carriers linked to a set of uplink carriers for a given UE. The downlink carriers can be adjacent or non-adjacent in the frequency domain, and the same holds for the uplink carriers. More generally speaking, the carriers do not need to be in the same frequency band, and time division duplex (TDD) bands could also be used as part of the multi-carrier operation. The number of downlink carriers may also be different from the number of uplink carriers in a multi-carrier connection for a given UE. If there is one uplink carrier, the number of downlink carriers can for example be two or more. The opposite with more uplink carriers than downlink carriers is also possible. Hereinafter, the "multi-carrier symmetry" of a connection refers to the number of uplink and downlink carriers in the multi-carrier connection for a given UE.

Conventionally, one anchor carrier can be defined in uplink and one in downlink, in a multi-carrier connection. The remaining carriers (uplink and downlink) can then be referred to as non-anchor (NA) carriers. For example, most of the control signaling can be carried on the anchor carrier, while the non-anchor carriers carry only the data channels and necessary control signaling channels that cannot be carried on the anchor carrier.

In prior art, WCDMA/HSPA systems make use of a mechanism to control the transmit power of the fractional downlink physical control channel (F-DPCH), which is the downlink channel that carries transmit power control commands from the NodeB to the UE used by the UE to adjust the transmit power of the uplink carrier. With this mechanism the transmit power control (TPC) commands are defined by the UE, based on measurements of the signals received from the NodeB. The TPC command can indicate either "up" corresponding to a power increase of e.g. 1 dB, or "down" corresponding to a power decrease. The TPC commands are transmitted on an uplink control channel, in order for the NodeB to adjust the downlink transmit power of the F-DPCH.

In a conventional multi-carrier HSPA system, there can be different multi-carrier symmetries with multiple downlink carriers and/or multiple uplink carriers for a given UE, as described above. The different carriers may use adjacent or non-adjacent frequency bands. A multi-carrier system also operates in soft handover scenarios. In all multi-carrier systems, there is a need to control the transmission power of the downlink carriers' F-DPCH. Downlink power control mechanisms has to be defined, going beyond the mechanisms used in single-carrier systems with only one uplink and one downlink carrier, e.g. because channel conditions may differ between different (potentially non-adjacent) downlink carriers. Thus, there is a need to provide an efficient and reliable control of the downlink transmit power of F-DPCH in a multi-carrier HSPA system, regardless of e.g. the multi-carrier symmetry and the used frequency bands for the different carriers.

SUMMARY

The object of the present invention is to address the problem outlined above, and this object and others are achieved by the method and the arrangement according to the appended independent claims, and by the embodiments according to the dependent claims.

A basic concept of the invention is to adapt the TPC command mechanism for F-DPCH transmit power control, used in single-carrier systems, to support different kinds of multi-carrier scenarios, including the different soft-handover scenarios.

Thus in accordance with a first aspect of the present invention, a method of downlink transmit power control in a user equipment of a multi-carrier wireless communication system is provided. The user equipment receives on N downlink carriers and transmits on M uplink carriers in the communication with at least one radio base station, where the sum of N and M is equal to or larger than three. The method comprises the step of defining at least one TPC command to be used by the radio base station for adjusting the transmit power of the F-DPCH on the N downlink carriers, the number of defined TPC commands being equal to or lower than N. It also comprises the step of transmitting the defined at least one TPC command on at least one of the M uplink carriers.

In accordance with a second aspect of the present invention, a method of downlink transmit power control in a radio base station of a multi-carrier wireless communication system is provided. The radio base station transmits on N downlink carriers and receives on M uplink carriers in the communication with at least one user equipment, where the sum of N and M is equal to or larger than three. The method comprises the step of receiving at least one TPC command on at least one of the M uplink carriers from the at least one user equipment, the number of received TPC commands being equal to or lower than N. It also comprises the step of adjusting the transmit power of the F-DPCH on the N downlink carriers based on the received at least one TPC command.

In accordance with a third aspect of the present invention, a user equipment of a multi-carrier wireless communication system is provided. The user equipment is arranged to receive on N downlink carriers and transmit on M uplink carriers in the communication with at least one radio base station, where the sum of N and M is equal to or larger than three. The user equipment comprises means for defining at least one TPC command to be used by the radio base station for adjusting the transmit power of the F-DPCH on the N downlink carriers, the number of defined TPC commands being equal to or lower than N. It also comprises means for transmitting the defined at least one TPC command on at least one of the M uplink carriers.

In accordance with a fourth aspect of the present invention, a radio base station of a multi-carrier wireless communication system is provided. The radio base station is arranged to transmit on N downlink carriers and receive on M uplink carriers in the communication with the at least one user equipment, where the sum of N and M is equal to or larger than three. The radio base station comprises means for receiving at least one TPC command on at least one of the M uplink carriers from the at least one user equipment, the number of received TPC commands being equal to or lower than N. It also comprises means for adjusting the transmit power of the F-DPCH on the N downlink carriers based on the received at least one TPC command.

An advantage of the embodiments of the present invention is that they provide a solution for downlink power control in a multi-carrier system. Another advantage of the embodiments of the present invention is that the different uplink carriers are used in a way that optimizes the reliability of the power control commands in the case of frequency selective uplink channel conditions.

DETAILED DESCRIPTION

Figure 1:
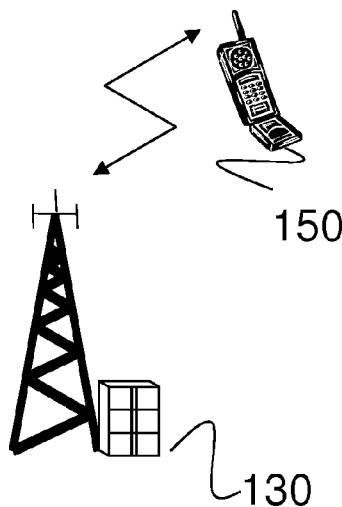
FIG. 1 illustrates schematically a part of a single- or multi-carrier WCDMA/HSPA system.

In the following, the invention will be described in more detail with reference to certain embodiments and to accompanying drawings. For purposes of explanation and not limitation, specific details are set forth, such as particular scenarios, techniques, etc., in order to provide a thorough understanding of the present invention. However, it will be apparent to one skilled in the art that the present invention may be practised in other embodiments that depart from these specific details.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as in a system comprising a computer processor and a memory coupled to the processor, wherein the memory is encoded with one or more programs that may perform the functions disclosed herein.

The present invention is described herein by way of reference to particular example scenarios. In particular the invention is described in a non-limiting general context in relation to a multi-carrier HSPA system. It should though be noted that the invention and its exemplary embodiments may also be applied to other types of radio access technologies with similar characteristics to HSPA in terms of power control, such as LTE, WiMAX and UTRA TDD. Furthermore, the present invention is described with the help of examples of different multi-carrier symmetries. However, the present invention is not limited to these examples. Any other multi-carrier symmetry will also be supported.

The present invention relates to methods and arrangements that enable control of the F-DPCH transmit power in a multi-carrier HSPA system. This is achieved by using the concept of TPC commands (used in single-carrier systems), adapted to support different kinds of multi-carrier scenarios, including the soft handover scenarios. An object is to provide an efficient and reliable power control mechanism for F-DPCH in a multi-carrier system, regardless of e.g. the multi-carrier symmetry and the frequency bands used for the different carriers.

In the present invention, one or more TPC commands are defined in the UE to control the transmit power of the F-DPCH on the downlink carriers, based on measurements of the signals from the NodeB. These TPC commands are then transmitted on the uplink carriers to the NodeB in different ways depending on the number of uplink carriers and on the number of defined TPC commands. The NodeB will receive the TPC command(s) and adjust the downlink power in different ways depending on the type of TPC command(s) and the multi-carrier symmetry.

In a first embodiment of the present invention, the TPC commands are transmitted on one or more uplink control channels on the uplink carriers. If more than one TPC command is to be transmitted on one uplink carrier (this case is further explained below), then each TPC command is mapped on a separate channel on that carrier. It is also possible to define a new control channel that can carry more than one TPC commands.

One main principle of the present invention is that the number of TPC commands that are defined and transmitted on the uplink shall be equal to or less than the number of downlink carriers to control. This means that for the case of one downlink carrier and two or more uplink carriers, only one TPC command shall be defined and transmitted on the uplink (i.e. on one or more uplink carriers) to control the downlink F-DPCH. In the case of multiple downlink carriers, the following two alternative embodiments are possible.

1. One TPC command per downlink carrier is defined and transmitted, in order for the NodeB to adjust the power of each downlink carrier's F-DPCH separately. The number of TPC commands thus corresponds to the number of downlink carriers.
2. One single common TPC command—i.e. common for all downlink carriers' F-DPCH—is defined and transmitted in order for the NodeB to adjust the power of all the downlink carriers' F-DPCH in the same way. In this embodiment, there are different alternatives on how to define the common TPC command. In a first alternative embodiment A, a TPC command valid for one of the downlink carrier's F-DPCH, e.g. the anchor carrier's F-DPCH, is used to power control all downlink carriers' F-DPCH in the same way. In a second alternative embodiment B, the different TPC commands valid for all the downlink carriers' F-DPCH are combined according to some pre-defined combination rule. In one embodiment the pre-defined combination rule is the "or of down" rule, stating that the combined value indicates "up" when all TPC commands indicate "up", and indicates "down" if at least one of the TPC commands indicates "down". In an alternative embodiment the pre-defined combination rule is the "or of up" rule, stating that the combined value indicates "down" when all TPC commands indicate "down", and indicates "up" if at least one of the TPC commands indicates "up".

A combination of the alternative embodiments 1 and 2 above is also possible, by using alternative embodiment 1 for one group of downlink carriers' F-DPCH, and alternative embodiment 2 for the rest of the downlink carriers' F-DPCH. In the example with three downlink carriers and two uplink carriers, one TPC command is defined to control the power of the two first downlink carriers' F-DPCH jointly (according to alternative embodiment 2 above) and one TPC command is defined to control the third downlink carrier's F-DPCH separately (according to alternative embodiment 1 above) for instance.

The transmission of the TPC command(s) may also vary with the different multi-carrier symmetries, as it depends on the number of available uplink carriers. In the case of alternative embodiment 1 above, there are three different alternatives for the transmission of the TPC commands, depending on if the number of uplink carriers M is larger than, smaller than, or equal to the number N of downlink carriers' F-DPCH to power control. The number of downlink carriers N corresponds to the number of defined TPC commands to transmit. The three alternatives are described below:

i. When the number of uplink carriers M is equal to or larger than the number of downlink carriers N to control, each TPC command is transmitted on a separate uplink carrier.

ii. However, when the number of uplink carriers M is larger than the number of downlink carriers N to control, one TPC command (e.g. the TPC command for the anchor downlink carrier) may be transmitted on more than one uplink carrier to control one of the downlink carrier's F-DPCH. The NodeB will then adjusts the transmit power for the downlink carrier's F-DPCH according to a combination of the commands received on the different uplink channels. The combination may be a soft combination using weight factors which are either fixed or set according to the estimated uplink channel conditions on respective carrier. The advantage of this alternative is that the reliability of the downlink power control is improved in case of frequency selective uplink channel conditions.

iii. When the number of uplink carriers M is smaller than the number of downlink carriers N to control, more than one TPC command is to be transmitted on one uplink carrier in order to be able to fit all TPC commands on the uplink carriers.

In the case of alternative embodiment 2 above with only one TPC command to transmit, there will always be an available uplink carrier to use for the transmission. However, if there are more than one uplink carriers, the reliability of the power control can be increased in case of frequency selective uplink channel conditions, according to a further exemplary embodiment, by transmitting the TPC command on more than one uplink carrier. The NodeB will then adjust the transmit power of the downlink carrier's F-DPCH according to a combination of the commands received on the different uplink channels. The combination may be a soft combination using weight factors which can be either fixed or set according to the estimated uplink channel conditions on respective carrier.

In the following, the above embodiments will be further explained with reference to FIGS. 2a-2f. In the figures, downlink is abbreviated DL and uplink is abbreviated UL.

Figure 2A:
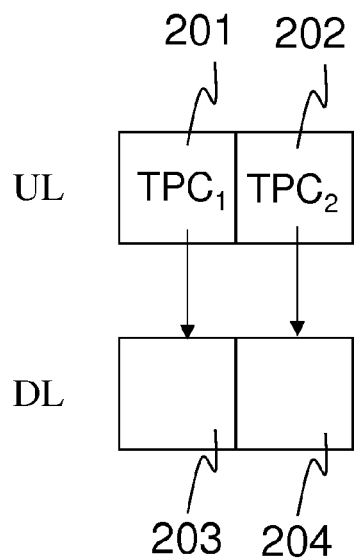
FIG. 2a-2f illustrates schematically different embodiments of the present invention applied in some examples of multi-carrier connections with different carrier symmetries.
Figure 2B:
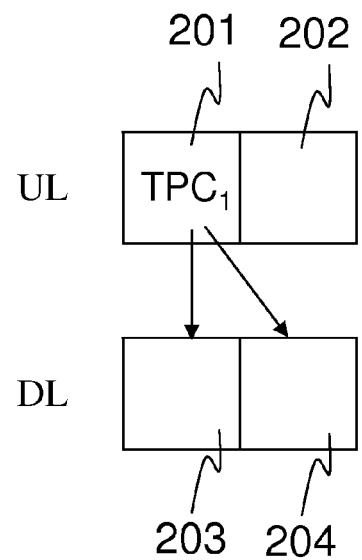

Starting with the alternative embodiment 1 above, and supposing a multi-carrier symmetry with two downlink carriers (one anchor carrier (A) 203 and one non-anchor carrier (NA) 204) and two uplink carriers (one anchor carrier (A) 201 and one non-anchor carrier (NA) 202), FIG. 2a illustrates how one TPC command ($TPC_1$) transmitted on the anchor uplink carrier 201 is used by the NodeB to adjust the transmit power of the anchor downlink carrier's F-DPCH 203, and one TPC command ($TPC_2$) transmitted on the non-anchor uplink carrier 202 is used by the NodeB to adjust the transmit power of the non-anchor downlink carrier's F-DPCH 204.

Figure 2C:
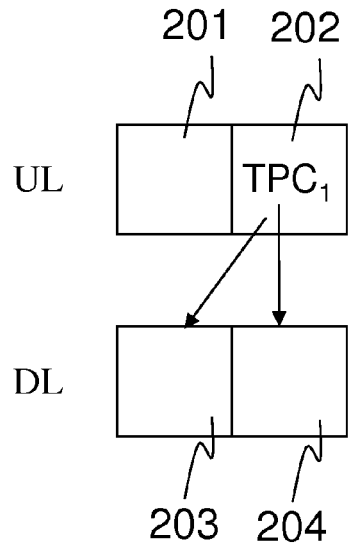

Power control in a system supposing the same example of multi-carrier symmetry as above with the alternative embodiment 2, and with the common TPC command defined according to any of the two alternatives A or B described above, is schematically illustrated in FIG. 2b. The TPC command $TPC_1$ is transmitted on the anchor uplink carrier 201, in order for the NodeB to adjust the transmit power of both the anchor 203 and the non-anchor downlink carrier's F-DPCH 204 in the same way. If $TPC_1$ indicates "up", then the transmit power of both downlink carriers' F-DPCH 203, 204 are adjusted by a power step "up". The $TPC_1$ command may also be transmitted on the non-anchor uplink carrier 202 instead, as illustrated in FIG. 2c. It is also possible, as discussed above, to transmit the $TPC_1$ command on both the anchor 201 and the non-anchor uplink carrier 202, in order to improve the reliability of the F-DPCH downlink power control in case of frequency selective uplink channel conditions.

Figure 2D:
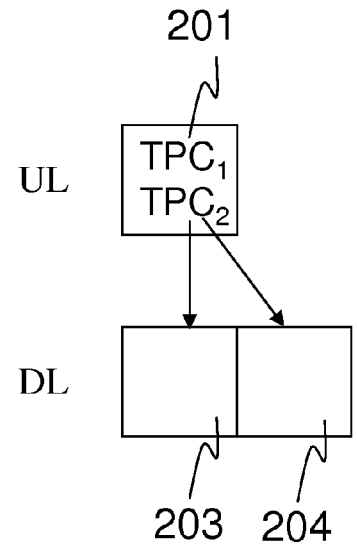

FIG. 2d illustrates the case of the alternative embodiment 1, supposing a multi-carrier symmetry with two downlink (one anchor 203 and one non-anchor carrier 204) and one uplink carrier 201. Two TPC commands ($TPC_1$ and $TPC_2$) are transmitted on separate control channels of the same uplink carrier 201, as described above. The NodeB adjusts the transmit power of the anchor downlink carrier's F-DPCH 203 according to the TPC command $TPC_1$ received on the first control channel of the anchor uplink carrier 201, and adjusts the transmit power of the non-anchor downlink carrier's F-DPCH 204 according to the TPC command $TPC_2$ received on the second control channel of the anchor uplink carrier 201.

Figure 2E:
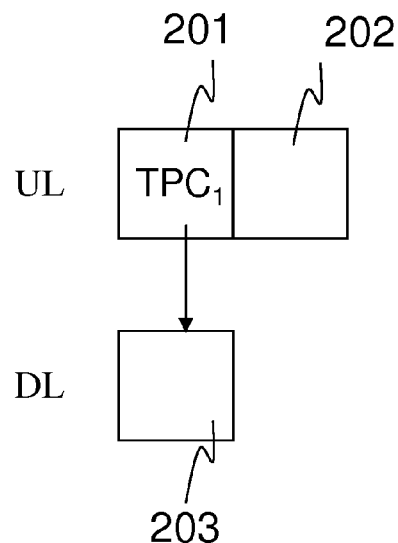
Figure 2F:
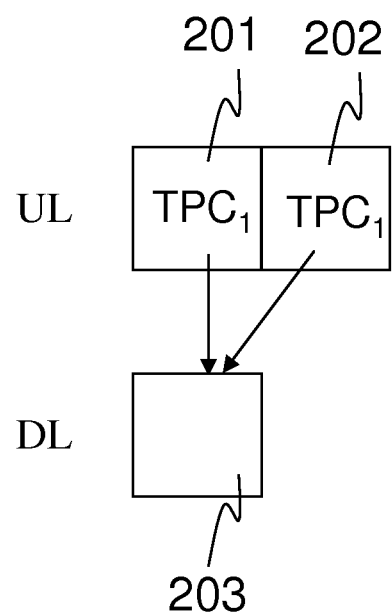

FIG. 2e-2f illustrates the case of a multi-carrier symmetry with two uplink carriers (one anchor 201 and one non-anchor carrier 202) and one downlink carrier 203. In this case there will only be one TPC command, as there is only one downlink carrier to control, so there is no difference between alternative embodiment 1 and 2. The TPC command $TPC_1$ is in FIG. 2e transmitted on the control channel of the anchor uplink carrier 201, in order for the NodeB to adjust the downlink carrier's F-DPCH. It is also possible to transmit $TPC_1$ on the control channel of the non-anchor uplink carrier 202 instead.

In order to improve the reliability of the downlink power control in case of frequency selective uplink channel conditions, and according to FIG. 2f, the TPC command $TPC_1$ is transmitted both on the control channel of the non-anchor uplink carrier 202 and on the control channel of the anchor uplink carrier 201. The NodeB will then adjust the downlink transmit power for the downlink carrier's F-DPCH 203 according to the soft combination of command $TPC_1$ received on the control channel of the anchor uplink carrier 201 (referred to as $TPC_{1A}$) and command $TPC_1$ received on the control channel of the non-anchor uplink carrier 202 (referred to as $TPC_{1NA}$) as follows: $TPC_1$ combined=$a1*TPC_{1A}+a2*TPC_{1NA}$, where a1 and a2 are real valued weight factors which can be either fixed or set according to estimated uplink channel conditions on respective carrier.

All embodiments of the present invention are applicable during soft handover as well as during non-soft handover. The same principles are followed regardless of the handover scenario. In soft handover the defined TPC commands will be received by multiple NodeBs. Thus, assuming the same multi-carrier symmetry for all NodeBs, the way of adjusting the transmit power of the different NodeBs F-DPCH based on the TPC commands is the same in soft handover as in non-soft handover.

Figure 3A:
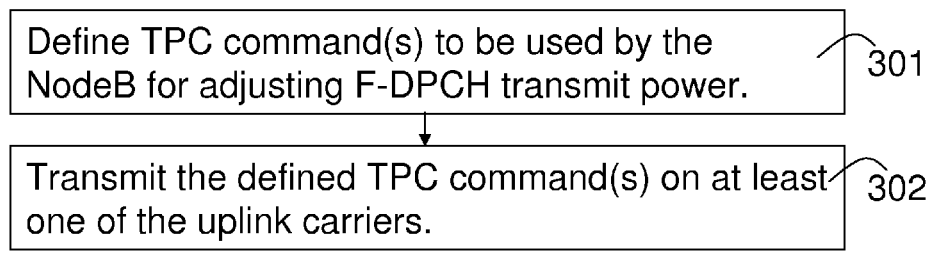
FIGS. 3a-3f are flowcharts of the methods of the radio base station and the UE according to different embodiments of the present invention.

FIG. 3a is a flowchart of the method for the UE, according to one embodiment of the present invention. In step 301 the UE defines at least one TPC command to be used by the NodeB for adjusting the transmit power of the at least one downlink carrier's F-DPCH. In the next step 302 the UE transmits the defined TPC command(s) on at least one of the uplink carriers.

Figure 3B:
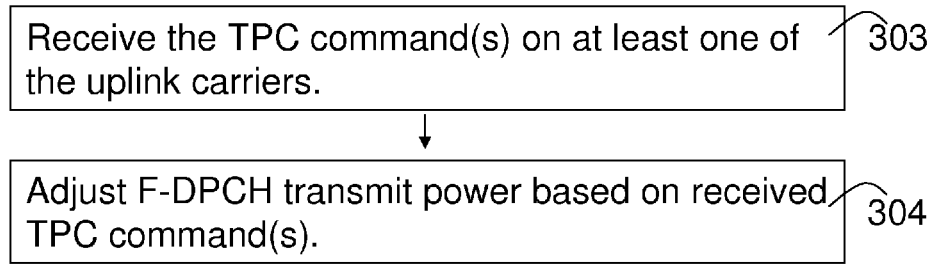

Furthermore, FIG. 3b is a flowchart of the method for the NodeB, according to one embodiment of the present invention. In step 303, the NodeB receives the TPC command(s) on at least one of the uplink carriers, from the UE. In the next step 304 the NodeB adjusts the transmit power of the at least one downlink carrier's F-DPCH based on the received TPC command(s).

Figure 3C:
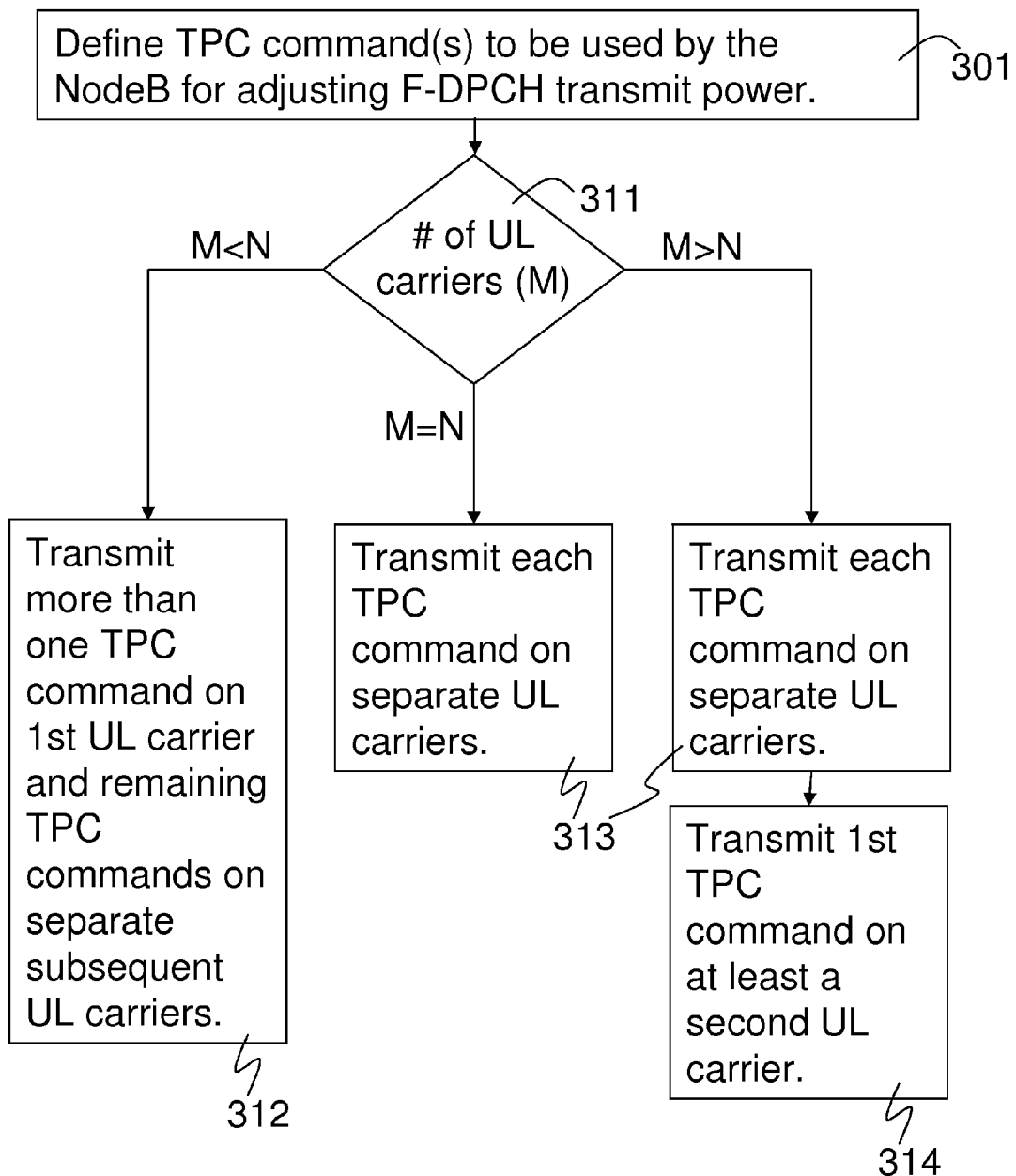

FIG. 3c is a flowchart of the method for the UE, according to alternative embodiment 1 above. In step 301 the UE defines N TPC commands to be used by the NodeB for adjusting the transmit power of the F-DPCH on the N downlink carriers respectively. Depending on the multi-carrier symmetry, i.e. the number of uplink carriers M, determined in step 311, in relation to the number of downlink carriers or TPC commands N, the step of transmitting 302 the N TPC commands comprises the sub step:

M<N: Transmitting, in step 312, more than one TPC commands on the first uplink carrier and the remaining TPC commands on separate subsequent uplink carriers. This is done in order to fit all N TPC commands onto the M uplink carriers.

M=N: Transmitting, in step 313, each TPC command on a separate uplink carrier.

M>N: Transmitting, in step 313, each TPC command on a separate uplink carrier and transmitting, in step 314, a first of the N TPC commands on at least one more uplink carrier. This is done in order to enhance the reliability of the power control of the F-DPCH on the first downlink carrier in case of frequency selective uplink channel conditions (carriers need not to be adjacent in the frequency band). This first TPC command could for example be the TPC command corresponding to the anchor downlink carrier's F-DPCH. It is also possible to only transmit each TPC commands on a separate uplink carrier, as in step 313. Some uplink carriers will then not carry any TPC command, thus saving signaling capacity.

Figure 3D:
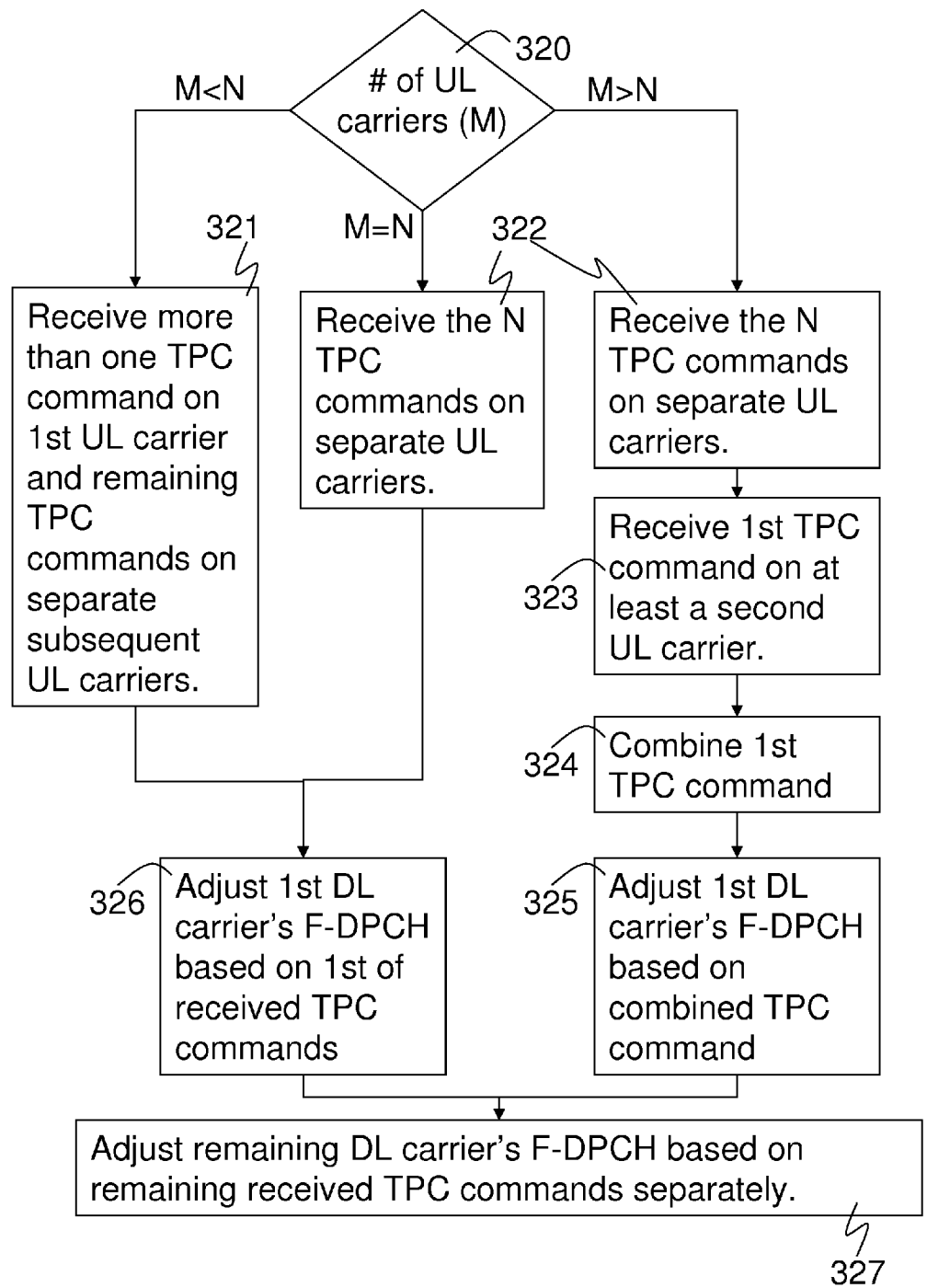

Furthermore, FIG. 3d is a flowchart of the method for the NodeB, according to one example of alternative embodiment 1 above. The step 303 of receiving (see FIG. 3b) the N TPC commands will in this embodiment also depend on the multi-carrier symmetry, i.e. the number of uplink carriers M, determined in step 320, in relation to the number of downlink carriers or TPC commands N, and will thus comprise the following sub step:

M<N: Receiving, in step 321, more than one TPC commands on the first uplink carrier and the remaining TPC commands on separate subsequent uplink carriers. The first TPC command can in this case be used to adjust, in step 326, the transmit power of the first downlink carrier's F-DPCH without any combining step.

M=N: Receiving, in step 322, each TPC command on a separate uplink carrier. Also in this case the first TPC command can be used to adjust, in step 326, the transmit power of the first downlink carrier's F-DPCH without any combining step.

M>N: Also here each TPC command is received on a separate uplink carrier as in step 322, but the first of the N TPC commands is also received, in step 323, on more than one uplink carrier. A combination step 324 is thus needed before the step 325 of adjusting the transmit power of the first downlink carrier's F-DPCH based on the combined TPC command.

The last step 327 is the adjustment of the transmit power of the remaining downlink carriers' F-DPCH based on the remaining received TPC commands separately, which is thus done regardless of if M is larger than, equal to or smaller than N.

Figure 3E:
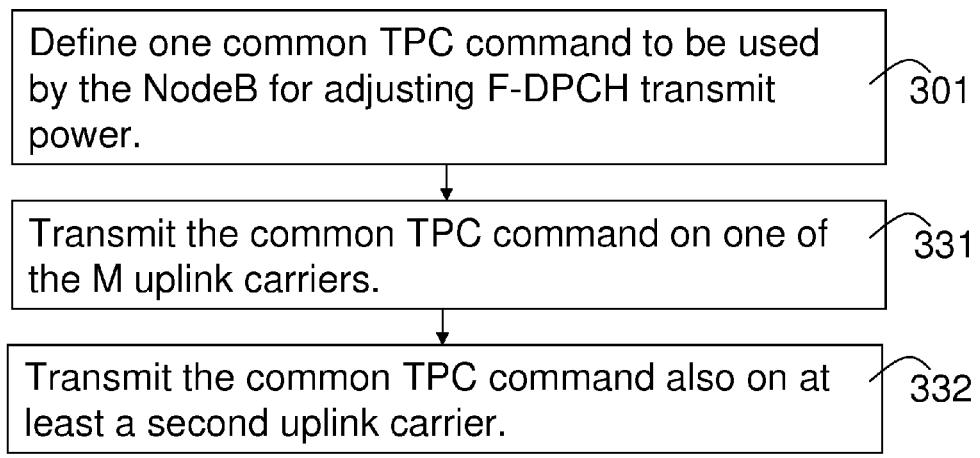

FIG. 3e is a flowchart of the method for the UE, according to alternative embodiment 2 above, when the number of uplink carriers M is larger than one. In step 301 the UE defines one common TPC command to be used by the NodeB for adjusting the transmit power of the N downlink carriers' F-DPCH. This definition of a common TPC command can be done according to either the first alternative embodiment A or the second alternative embodiment B described above. The UE then transmits, in step 331, the common TPC command on one of the M uplink carriers, and in order to enhance the reliability of the power control of the F-DPCH on the first downlink carrier in case of frequency selective uplink channel conditions, it also transmits, in step 332, the common TPC command on at least a second uplink carrier.

Figure 3F:
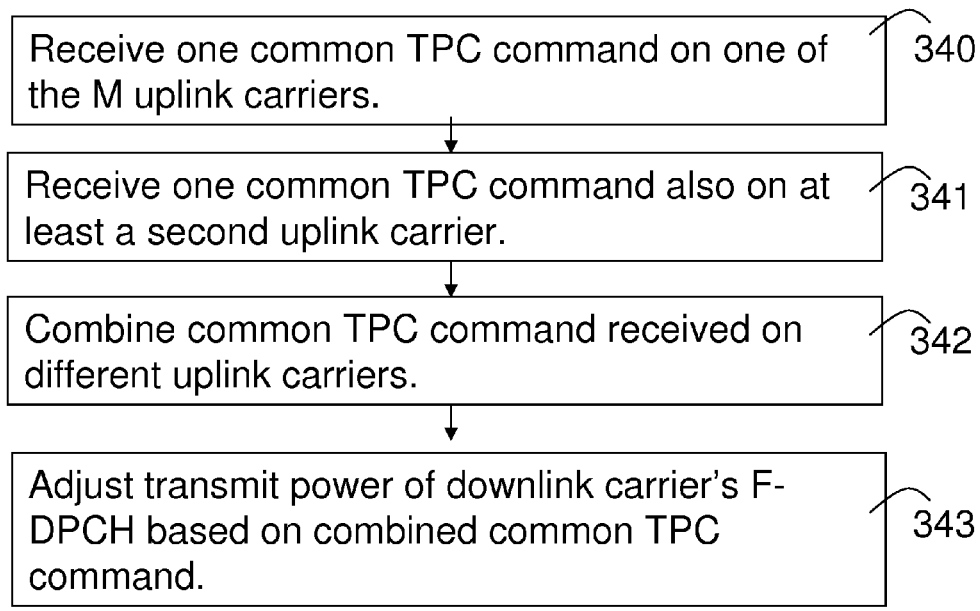

Furthermore, FIG. 3f is a flowchart of the method for the NodeB, according to alternative embodiment 2 above, when the number of uplink carriers M is larger than one. In step 340, the NodeB receives the common TPC command on one of the M uplink carriers, from the UE. However it also receives, in step 341, the common TPC command on at least a second uplink carrier. This means that the NodeB must combine, in step 342, the TPC commands received on the different uplink carriers, before it can adjust, in step 343, the transmit power of the downlink carriers' F-DPCH based on the combined common TPC command.

Figure 4:
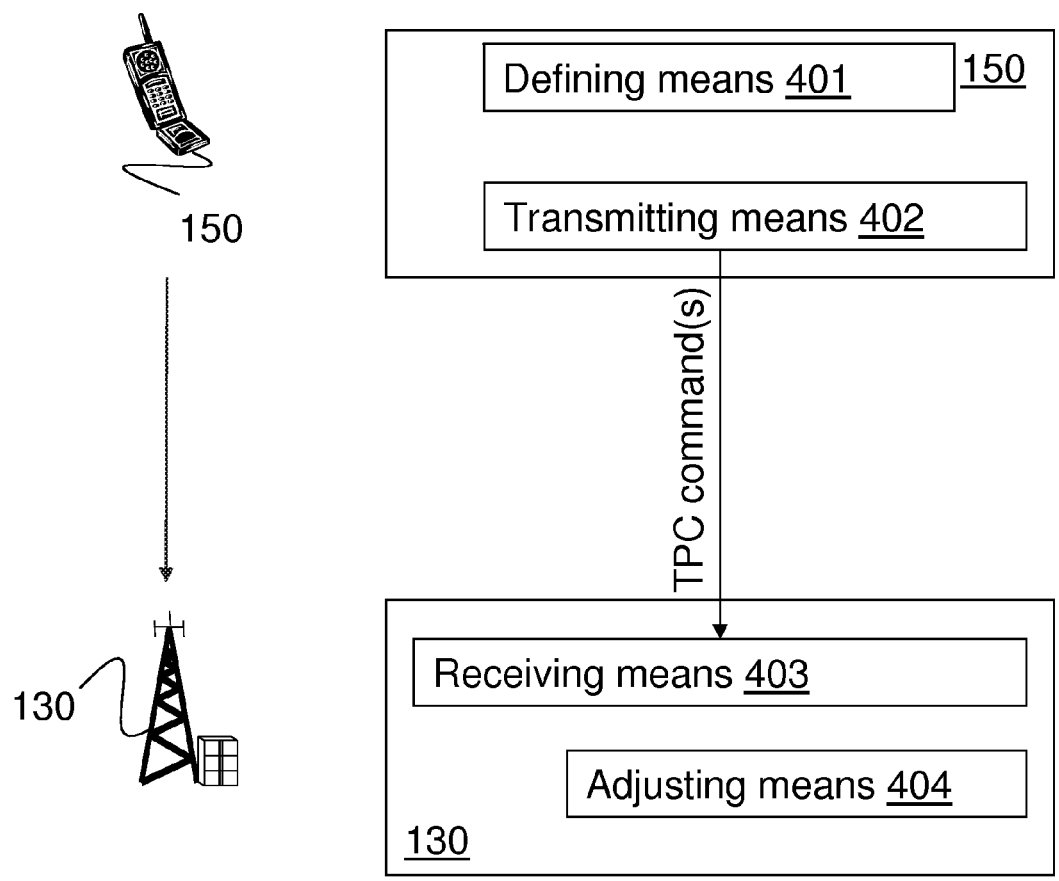
FIG. 4 illustrates schematically the NodeB and UE according to embodiments of the present invention.

Schematically illustrated in FIG. 4 and according to one embodiment, the UE 150 comprises means for defining 401 one or more TPC commands to be used by the NodeB for adjusting the transmit power of the downlink carriers' F-DPCH. It also comprises means for transmitting 402 the defined TPC command(s) on the uplink carriers.

Also illustrated in FIG. 4 is the NodeB 130. It comprises means for receiving 403 one or more TPC commands on the uplink carriers from the UE. It also comprises means for adjusting 404 the transmit power of the downlink carriers' F-DPCH based on the received TPC command(s).

It should be noted that the means illustrated in FIG. 4 may be implemented by physical or logical entities using software functioning in conjunction with a programmed microprocessor or general purpose computer, and/or using an application specific integrated circuit (ASIC).

The above mentioned and described embodiments are only given as examples and should not be limiting to the present invention. Other solutions, uses, objectives, and functions within the scope of the invention as claimed in the accompanying patent claims should be apparent for the person skilled in the art.

The invention claimed is:

1. A method of downlink transmit power control (TPC) in a radio base station of a multi-carrier wireless communication system, wherein the radio base station transmits on N downlink carriers and receives on M uplink carriers in communication with at least one user equipment, and wherein N and M are integers and the sum of N and M is equal to or larger than three, said method comprising the steps of:
   receiving a TPC command on at least one of the M uplink carriers from the at least one user equipment, the number of received TPC commands being equal to N, the receiving step comprising the sub steps of:
      receiving both a first and at least a second of said N TPC commands on a first uplink carrier while receiving each of the remaining TPC commands on separate subsequent uplink carriers from the at least one user equipment, when M is smaller than N; and
      receiving the N TPC commands on separate uplink carriers from the at least one user equipment, when M is larger than or equal to N; and
   adjusting a transmit power of a fractional downlink control channel (FDPCH) on the N downlink carriers based on the received at least one TPC command.

2. The method according to claim 1, wherein said at least one TPC command is received on at least one uplink control channel of said M uplink carriers.

3. The method according to claim 1, wherein the step of adjusting the transmit power of the F-DPCH on the N downlink carriers includes the sub step of adjusting the transmit power of each F-DPCH of the N downlink carriers based on each of the received N TPC commands separately.

4. The method according to claim 1, wherein the step of receiving the N TPC commands on at least one of the M uplink carriers also comprises the sub step of receiving the first of the N TPC commands also on at least a second uplink carrier, when M is larger than N, and wherein the step of adjusting the transmit power of the F-DPCH of the N downlink carriers comprises the sub steps of:
   combining the first of the N TPC commands received on the first uplink carrier and on at least a second uplink carrier according to a soft combining rule, when M is larger than N;
   adjusting the transmit power of the F-DPCH of the first downlink carrier based on the combined TPC command, when M is larger than N;
   adjusting the transmit power of the F-DPCH of the first downlink carrier based on the first of the received N TPC commands when M is equal to or smaller than N; and
   adjusting the transmit power of the F-DPCH of each of the remaining downlink carriers based on the remaining received TPC commands separately.

5. A method of downlink transmit power control (TPC) in a radio base station of a multi-carrier wireless communication system, wherein the radio base station transmits on N downlink carriers and receives on M uplink carriers in communication with at least one user equipment, and wherein N and M are integers and the sum of N and M is equal to or larger than three, said method comprising the steps of:
   receiving a common TPC command on a first and a second one of the M uplink carriers from the at least one user equipment; and
   adjusting the transmit power of a fractional downlink control channel (F-DPCH) on the N downlink carriers based on the received common TPC command.

6. The method according to claim 5, wherein the step of adjusting the transmit power comprises the sub steps of:
   combining each of said common TPC command received on one and on at least the second of the M uplink carriers into a combined common TPC command according to a soft combining rule; and
   adjusting the transmit power of the F-DPCH of the N downlink carriers based on the combined common TPC command.

7. A radio base station of a multi-carrier wireless communication system, wherein the radio base station is configured to transmit on N downlink carriers and receive on M uplink carriers in communication with at least one user equipment, and wherein N and M are integers and the sum of N and M is equal to or larger than three, said radio base station comprising a programmed processor executing software instructions, wherein when the processor executes the software instructions, the radio base station is caused to perform the following:
   receive at least one transmit power control (TPC) command on at least one of the M uplink carriers from the at least one user equipment, the number of received TPC commands being equal to N; and
   adjust a transmit power of a fractional downlink control channel (F-DPCH) on the N downlink carriers based on the received at least one TPC command;
   wherein the radio base station is configured to:
      receive both a first and at least a second of said N TPC commands on a first uplink carrier and to receive each of the remaining TPC commands on separate, subsequent uplink carriers from the at least one user equipment, when M is smaller than N; and
      receive the N TPC commands on separate uplink carriers from the at least one user equipment, when M is larger than or equal to N.

8. The radio base station according to claim 7, wherein the radio base station is configured to adjust the transmit power of the F-DPCH on the N downlink carriers by adjusting the transmit power of each of the downlink carriers' F-DPCH based on each of the received N TPC commands separately.

9. The radio base station according to claim 7, wherein the radio base station is configured to receive the N TPC commands on at least one of the M uplink carriers by:
   receiving the first of said N TPC commands also on at least a second uplink carrier, when M is larger than N; and
   wherein the radio base station is configured to adjust the transmit power of the F-DPCH on the N downlink carriers by:
   combining the first of said N TPC commands received both on the first uplink carrier and on at least a second uplink carrier according to a soft combining rule, when M is larger than N;
   adjusting the transmit power of the F-DPCH of the first downlink carrier based on the combined TPC command, when M is larger than N;
   adjusting the transmit power of the F-DPCH of the first downlink carrier based on the first of the received N TPC commands, when M is equal to or smaller than N; and
   adjusting the transmit power of each F-DPCH of the remaining downlink carriers based on the remaining received TPC commands separately.

10. A radio base station of a multi-carrier wireless communication system, wherein the radio base station is arranged to transmit on N downlink carriers and receive on M uplink carriers in communication with at least one user equipment, and wherein N and M are integers and the sum of N and M is equal to or larger than three, said radio base station comprising:
- a programmed processor executing software instructions, wherein when the processor executes the software instructions, the radio base station is caused to perform the following steps:
  - receiving a common transmit power control (TPC) command on a first and a second one of the M uplink carriers from the at least one user equipment; and
  - adjusting the transmit power of the fractional downlink control channel, F-DPCH, on the N downlink carriers based on the received common TPC command.

11. The radio base station according to claim 10, wherein the software instructions include instructions for adjusting the transmit power of the N downlink carriers' F-DPCH based on said common TPC command.

12. The radio base station according to claim 10, wherein the software instructions include instructions for adjusting the transmit power by:
- combining the common TPC command received on the first and second M uplink carriers into a combined common TPC command according to a soft combining rule; and
- adjusting the transmit power of the F-DPCH of the N downlink carriers based on the combined common TPC command.

13. A method of downlink transmit power control in a multi-carrier wireless communication system, wherein a user equipment, UE, receives on N downlink carriers and transmits on M uplink carriers in communication with a radio base station, wherein N and M are integers and the sum of N and M is equal to or larger than three, said method comprising the steps of:
- defining by the UE, at least one transmit power control (TPC) command to be used by the radio base station for adjusting a transmit power of a fractional downlink physical control channel (F-DPCH) on the N downlink carriers, the number of defined TPC commands being equal to N;
- transmitting by the UE, the N TPC commands on at least one of the M uplink carriers, the transmitting step comprising the sub steps of:
  - transmitting both a first and at least a second of said N TPC commands on a first uplink carrier and each of the remaining TPC commands on separate subsequent uplink carriers, in order to fit all N TPC commands onto the M uplink carriers when M is smaller than N; and
  - transmitting each of said N TPC commands on separate uplink carriers when M is larger than or equal to N;
- receiving by the base station, the N TPC commands on at least one of the M uplink carriers from the UE, the receiving step comprising the sub steps of:
  - receiving both the first and at least the second of the N TPC commands on a first uplink carrier while receiving each of the remaining TPC commands on separate subsequent uplink carriers from the UE, when M is smaller than N; and
  - receiving the N TPC commands on separate uplink carriers from the UE, when M is larger than or equal to N; and
- adjusting by the base station, the transmit power of the F-DPCH on the N downlink carriers based on the received at least one TPC command.

14. A method of downlink transmit power control in a multi-carrier wireless communication system, wherein a user equipment (UE) receives on N downlink carriers and transmits on M uplink carriers in communication with a radio base station, wherein N and M are integers and the sum of N and M is equal to or larger than three, said method comprising the steps of:
- defining by the UE, a common transmit power control (TPC) command to be used by the radio base station for adjusting a transmit power of a fractional downlink physical control channel (F-DPCH) on the N downlink carriers;
- transmitting by the UE, the common TPC command on a first and a second one of the M uplink carriers;
- receiving by the base station, the common TPC command on the first and second M uplink carriers from the UE; and
- adjusting by the base station, the transmit power of the F-DPCH on the N downlink carriers based on the received common TPC command.

* * * * *

UNITED STATES PATENT AND TRADEMARK OFFICE
CERTIFICATE OF CORRECTION

Page 1 of 1

PATENT NO.      : 8,804,587 B2
APPLICATION NO. : 12/989677
DATED           : August 12, 2014
INVENTOR(S)     : Gerstenberger et al.

It is certified that error appears in the above-identified patent and that said Letters Patent is hereby corrected as shown below:

In the Claims

In Column 9, Lines 27-28, in Claim 1, delete "downlink control channel (FDPCH)" and insert -- downlink physical control channel (F-DPCH) --, therefor.

In Column 10, Lines 1-2, in Claim 5, delete "downlink control channel (F-DPCH)" and insert -- downlink physical control channel (F-DPCH) --, therefor.

In Column 10, Lines 27-28, in Claim 7, delete "downlink control channel (F-DPCH)" and insert -- downlink physical control channel (F-DPCH) --, therefor.

Signed and Sealed this
Twenty-sixth Day of May, 2015

Michelle K. Lee
*Director of the United States Patent and Trademark Office*